Dec. 26, 1950    L. W. FLOWERS ET AL    2,535,126
HUB CAP LOCKING DEVICE
Filed Jan. 7, 1948
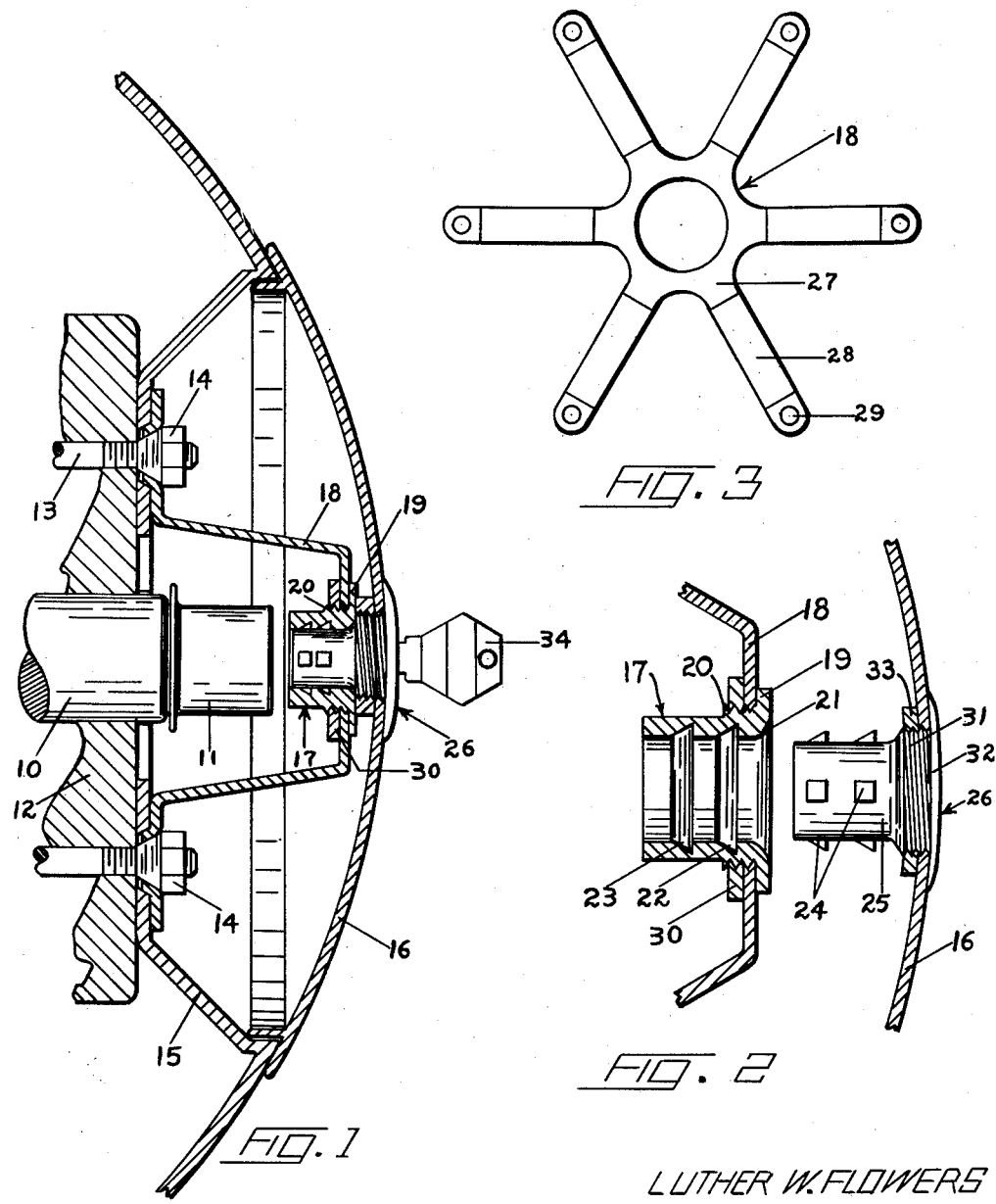
LUTHER W. FLOWERS
HICE J. GREEN
INVENTOR.
BY *Hubert Miller*
ATTORNEY.

Patented Dec. 26, 1950

2,535,126

UNITED STATES PATENT OFFICE 2,535,126

HUB CAP LOCKING DEVICE

Luther W. Flowers and Hice J. Green, Wichita, Kans.

Application January 7, 1948, Serial No. 956

1 Claim. (Cl. 70—169)

This invention relates to a key controlled assembly for locking automobile hub caps, and consequently the wheel and tire assembly, against unlawful removal and theft.

Assemblies of this general type have previously been developed, but to the best of our knowledge they have either served only to prevent theft of the wheel and not the hub cap, or they have included complicated locking mechanisms, some of which have even included bearings, and all of which had to be built into the hub cap at the factory, and required wheels of special design to cooperate with the locking mechanism.

It is a prime object of our invention to provide a hub cap locking assembly the two main parts of which may be easily and quickly installed respectively on any wheel of standard size, and on any standard hub cap.

Briefly the invention includes a keeper portion which is attached rigidly to the wheel either by the studs which normally secure the wheel to its hub structure, or by any other desired means such as spot welding, riveting, etc.; it also includes a cooperating key controlled locking mechanism which is centrally secured in the hub cap simply by inserting it in a drilled hole of proper size, and tightening a nut from the inside of the hub cap.

It is another object of this invention to provide an assembly, as described, which is so constructed and designed that the hub cap does not have to be rotated to a predetermined position with relation to the wheel or keeper in order to be locked on the wheel, but can be snapped into place regardless of its position of orientation, the same as is possible before installation of the locking assembly.

The details of construction of a preferred form of the invention, together with other objects attending its production, will be more clearly understood when the following description is read in connection with the accompanying drawings, in which:

Figure 1 is a fragmentary lateral vertical section through an automobile wheel structure showing the invention installed, with the hub cap locked in place;

Figure 2 is a fragmentary vertical sectional view showing the keeper and locking mechanism separated; and Figure 3 is a top plan view of a preferred form of spider which constitutes a part of the keeper assembly.

Referring to Figure 1 of the drawings, the numeral 10 designates an automobile axle with a grease cup 11 installed. It carries a conventional hub structure 12 having a plurality of studs 13 which cooperate with nuts 14 to hold a conventional wheel 15 in place on the hub. This conventional assembly is completed by a standard hub cap 16, the rim of which normally cooperates with spring clips or snaps (not shown) on the wheel, to close the hub cavity of the wheel. All these parts are old and well known and are to be found on any present day automobile.

Our invention includes a keeper assembly made up of a keeper proper 17, and a keeper supporting metal spider 18. The keeper 17 is in the form of a metal sleeve having a flange 19 at its outer end, and threads 20 adjacent the flange. Its bore is tapered at the outer end, as at 21, to facilitate entry of the locking mechanism. Internally, the bore of the keeper is provided with parallel annular grooves 22 and 23, which cooperate with spring pressed outwardly projecting dogs 24 mounted in the barrel 25 of a conventional key operated locking mechanism, designated as a whole by the numeral 26.

The spider 18 has a perforated central portion 27, and a plurality of outwardly extending arms 28, which are provided with perforations 29 at their outer ends. The number of these arms and their spacing corresponds to the number and spacing of studs 13 on the particular wheel. As will be clearly seen in Figure 1, the arms of this spider are bent downward from the central portion 27, and outward adjacent their outer ends. This spider may be connected to the wheel structure by removing the nuts 14, placing the spider in position on the studs 13, and then replacing and tightening the nuts.

The central perforation in this spider is of a size to snugly receive the threaded portion 20 of the keeper. The keeper is simply inserted in this central perforation, and a nut 30 is then tightened to anchor the keeper rigidly in place. With the keeper thus anchored in position on the spider, and the entire keeper assembly anchored to the wheel, as shown, it will be seen that the arms of the spider hold the keeper in a central position with relation to the axle, hub, wheel, and hub cap. It will also be noted that the inner end of the spider is spaced outward from the nearest obstruction, while its outer end is held in close proximity to the hub cap.

As previously stated the locking mechanism 26 is of conventional construction and a description of its interior operating parts is not considered necessary. Near the outer end of the lock cylinder or barrel 25, there is a slightly enlarged threaded shoulder 31, and an enlarged plate 32.

Installation of the locking mechanism on the hub cap is clearly illustrated in Figure 2. The hub cap is provided with a centrally located perforation sufficiently large to receive the threaded shoulder 31. A nut 33 is then screwed onto this shoulder tightly, and is locked thereon in any suitable manner, such as by simultaneously denting the side of the nut and the threads of the shoulder with a hand punch, which is common practice.

With the locking mechanism installed centrally on the hub cap, and the keeper mechanism installed centrally on the wheel, it will be seen that the hub cap can be applied to the wheel in the usual manner, and without the necessity of using a key. The end of the lock barrel is simply inserted in the bore of the keeper, and outside pressure is applied to snap the hub cap into locked position. The dogs 24 of the lock enter the grooves 22 of the keeper and positively prevent removal of the hub cap, and consequently the wheel, until the dogs are retracted by a key 34. It is contemplated as a matter of convenience that the tumblers of the lock will be set to operate with the key which operates the automobile ignition lock or rear deck lock. This is optional, however.

As mentioned above, the free ends of the arms 28 of the spider may be secured to the wheel in ways other than the one described. For instance, the perforations at the free ends of these arms may be omitted, and the tips of the arms may be spot welded or riveted directly to the wheel at points between the stud receiving perforations. Such an arrangement is entirely within the inventive idea disclosed.

In addition, either the keeper 17 or the lock assembly 26, or both, may be mechanically secured respectively to the spider and the hub cap in ways other than those described.

Having described the invention with sufficient clarity to enable those familiar with this art to construct and use it, we claim:

Mechanism for locking a hub cap on a wheel, comprising: an outwardly projecting spider anchored concentrically on the wheel hub and having a concentric perforation therein; a substantially cylindrical sleeve having an externally threaded surface, having an enlarged right angled flange at one end, and having its bore bevelled outwardly at that end nearest said flange, the main body portion of said sleeve being adapted to fit tightly within the concentric perforation in said spider; a nut on said sleeve cooperating with said flange to rigidly secure the sleeve to said spider; an annular groove cut into the inner wall of said sleeve; a key controlled substantially cylindrical lock assembly having an enlarged threaded shoulder near one end and an integral right angled flange projecting outwardly adjacent the outermost end of said threaded shoulder; a concentric perforation in the hub cap of a size to snugly receive the enlarged threaded shoulder on the lock assembly; a nut for said threaded shoulder cooperating with the adjacent flange to rigidly secure the lock assembly concentrically to the hub cap with the flange abutting the exterior surface thereof; outwardly spring pressed key retractable dogs normally projecting outwardly beyond the surface of the cylindrical portion of said lock assembly, said cylindrical portion being adapted to be received complementally in the bore of said sleeve with the threaded shoulder of the lock assembly abutting the outer surface of the flange on the sleeve to limit penetration of the lock assembly, said dogs adapted to be forcibly retracted by contact with the bevelled portion of the sleeve bore as the lock assembly is manually pushed into said sleeve, and to seat in the annular internal groove in said sleeve, and thereby prevent withdrawal of the lock assembly until such time as the dogs are key retracted, whereby when the lock assembly is locked in said sleeve removal of the hub cap from the wheel is positively prevented.

LUTHER W. FLOWERS.
HICE J. GREEN.

REFERENCES CITED

The following references are of record in the file of this patent:

UNITED STATES PATENTS

| Number | Name | Date |
|---|---|---|
| 2,005,535 | Duarte | June 18, 1935 |
| 2,328,301 | Shaw, Jr. | Aug. 31, 1943 |
| 2,329,945 | Schatzman | Sept. 21, 1943 |
| 2,345,949 | Robbins | Apr. 4, 1944 |
| 2,377,542 | Crew | June 5, 1945 |

FOREIGN PATENTS

| Number | Country | Date |
|---|---|---|
| 753,380 | France | Aug. 7, 1933 |